Patented May 7, 1940

2,199,799

UNITED STATES PATENT OFFICE 2,199,799

ADDITION PRODUCTS OF THIOPHENOLS AND ACRYLIC ACID ESTERS

Ralph A. Jacobson, Wilmington, Del., assignor to E. I. du Pont de Nemours & Company, Wilmington, Del., a corporation of Delaware No Drawing. Application March 9, 1937, Serial No. 129,841

12 Claims. (Cl. 260—470)

This invention relates to new compositions of matter and to processes for their preparation. More particularly it relates to new thio derivatives obtained by the condensation of thiophenols and acrylic acid esters. Still more particularly it relates to aryl thioethers of alkyl isobutyrates and to alkyl substituted acrylic ester dimers containing an aryl thioether group.

An object of this invention is to provide aryl thioethers of isobutyric acid esters and aryl thioether dimers of alkacrylic acid esters by the interaction of thiophenols with acrylic and alkacrylic acid esters. A further object is to provide new and useful plasticizers and modifying agents for synthetic resins, cellulose derivatives, etc. A still further object is to provide a process for preparing the aforementioned aryl thioether derivatives.

These objects may be accomplished by allowing approximately equimolecular amounts of an ester of an alkacrylic acid and a thiophenol to stand for one week under a strong light. Upon distillation the aryl thioether of an alkyl isobutyrate and the aryl thioether dimer of an alkacrylate are obtained as the lower boiling and the higher boiling constituents, respectively. Because of the large difference in their boiling points, the two products are easily separated and purified by distillation. In the preferred embodiment of the invention the particular acrylic acid ester used is methyl methacrylate.

I have found that aryl thioethers of methyl isobutyrate can be easily obtained merely by exposing a mixture of methyl methacrylate and a thiophenol to a 100-watt light and distilling the mixture. After removing the aryl thioether of methyl isobutyrate, further distillation yields the aryl thioether dimer of methyl methacrylate. It appears that the aryl thioethers of methyl isobutyrate are the beta derivatives, i. e.,

RSCH$_2$CH(CH$_3$)COOCH$_3$, and the dimer derivatives are the aryl thioethers of dimethyl adipic methyl ester.

(CH$_3$OOC(C$_6$H$_5$S)C(CH$_3$)CH$_2$CH$_2$CH(CH$_3$)COOCH$_3$)

While the above formulas are definite possibilities, the structures have not been absolutely established.

The invention may be illustrated by the following examples, in which the parts are by weight unless otherwise indicated:

Example 1.—A mixture of 100 parts of thiophenol and 102 parts of methyl methacrylate was exposed to a 150-watt light bulb for one week. The material was then distilled in a modified Claisen flask. Two main products were obtained. The lower boiling product (1) boiled at 129–130° under 2 mm. pressure, had a refractive index $N_D^{20}1.5420$ and amounted to 139 parts. Analytical data indicated this product to be the phenyl thioether of methyl isobutyrate—and the beta derivative. The higher-boiling product (2) boiled at 189–190° at 2.5 mm. pressure, had a refractive index $N_D^{20}1.5279$ and amounted to 41 parts. Analytical data indicated that this product was a dimer of methyl methacrylate containing one molecule of thiophenol. Empirical structures for the compounds are as follows:

(1) C$_6$H$_5$SCH$_2$CH(CH$_3$)COOCH$_3$ (2) 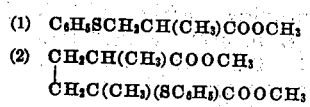

Example 2.—A mixture of 100 parts of m-thiocresol and 93 parts of methyl methacrylate was exposed to Mazda light and distilled as in Example 1. Two main products were obtained. The first (1) boiled at 111–113° under 1 mm. pressure, had a refractive index of $N_D^{20}1.5380$ and amounted to 82 parts. Chemical analysis indicated that this product was the m-cresyl thioether of methyl isobutyrate. The higher-boiling product (2) boiled at 190–195° at 2 mm., had a refractive index of $N_D^{20}1.5266$ and amounted to 30 parts. The analytical data indicated that this product was a dimer of methyl methacrylate containing one molecule of m-thiocresol. Empirical structures for the compounds are as follows:

(1) m-CH$_3$C$_6$H$_4$SCH$_2$CH(CH$_3$)COOCH$_3$ (2) 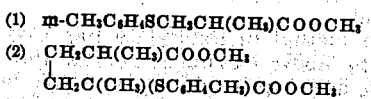

Example 3.—A mixture of 108 parts of p-thiocresol and 100 parts of methyl methacrylate was exposed to a Mazda light for one week and the mixture distilled. Two main products were obtained. The first (1) boiled at 132–134° under 1.5 mm. pressure, had a refractive index of $N_D^{20}1.5366$ and amounted to 152 parts. Analytical data indicated that the product was p-cresyl thioether of methyl isobutyrate. The second product (2) boiled at 185–190° under 1.5 mm. pressure, had a refractive index of $$N_D^{20} 1.5294$$

and amounted to 40 parts. Analytical data indicated that this product was the dimer of methyl methacrylate containing one molecule of p-thiocresol. Empirical structures for the two compounds are as follows:

(1) p-CH₃C₆H₄SCH₂CH(CH₃)COOCH₃

(2) CH₂CH(CH₃)COOCH₃
    |
    CH₂C(CH₃)(SC₆H₄CH₃)COOCH₃

*Example 4.*—A mixture of 30 parts of thio beta-naphthol and 57 parts of methyl methacrylate was exposed to a 150-watt Mazda light for one week and distilled as in the previous examples. A product boiling at 173–175° under 1 mm. pressure with a refractive index $$N_D^{20} = 1.6089$$

and amounting to 20 parts was obtained. Analytical data indicated that this was the beta-thionaphthyl ether of methyl isobutyrate. The residue after removal of this product was a syrup which did not appear to be distillable even at low pressure.

*Example 5.*—A mixture of 21 grams (0.0678 mols) of the dimer from methyl methacrylate and thiophenol, 200 cc. of methanol, and a solution of 5.4 grams of sodium hydroxide in 20 grams of water was refluxed gently for 6 hours. Most of the methanol was removed by evaporation and the mixture acidified with hydrochloric acid in the cold. The plastic mass which separated solidified on standing. After purification by recrystallization from acetone the product melted at 134–135° C. The analysis confirms with a product of the following formula:

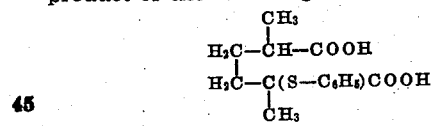

Analysis: Calculated for C₁₄H₁₈O₄S; C, 59.57; H, 6.38; S, 11.33; Neutral equivalent 141—found: C, 59.89; H, 6.56; S, 11.17; Neutral equivalent 143.

*Example 6.*—A composition was made containing:

| | Parts by weight |
|---|---|
| Cellulose acetate (52.4% acetyl) | 100 |
| Beta-p-thiocresyl ether of methyl isobutyrate (the product of Example 3) | 34 |
| Acetone | 250 |
| Total | 384 |

The above materials were colloided in a suitable mixing machine, filtered, and films thereof cast. The product thus obtained is suitable for cinema films.

Although methyl methacrylate has been disclosed in the above examples, acrylic and other methacrylic acid esters such as the ethyl, propyl, isobutyl, butyl, isopropyl, amyl, isoamyl, hexyl, octyl, dodecyl, cyclohexyl, and benzyl may be used. They are all employed, of course, in a monomeric form. Esters of other acrylic acids substituted in the alpha position such as α-ethyl acrylic, α-propyl, α-butyl, α-amyl, α-hexyl, etc., may also be employed.

Thiophenols other than those described in the examples may be used such, for example, as ortho-, meta-, and para-nitrothiophenols, ortho-, meta-, and para-aminothiophenols, thioresorcinol, ortho-, meta-, and para-halogen substituted thiophenols, etc. The term thio-phenols is used in this specification and claims in its broader sense to include not only C₆H₅SH but one or more substituted or unsubstituted phenol groups attached to an SH group.

It is to be understood that while it is believed that the compositions of matter described herein are esters of aryl-thio isobutyric acids and aryl thio dimers of alkacrylic esters, the invention is not to be limited by any explanation or theory as to the nature or chemical structures of the reaction products but only by the description of their properties and the method used in their preparation.

While equal molecular proportions of ingredients are designated it is not necessary that such proportions be exactly adhered to for proportions ranging from one to five molecular equivalents of the alkacrylate to one molecular equivalent of the thiophenol will give satisfactory results. Where an excess of the alkacrylate is used, it can be recovered by distillation. Further, in many instances, the time of exposure may be cut down to a matter of a few hours particularly when the reactants are heated to temperatures above room temperatures, say, up to approximately 60° C. Temperatures below room temperature may be employed but with a corresponding increase in reaction time. Pressures below or in excess of atmospheric may be used.

The reaction appears to be catalyzed by actinic light, e. g., from ordinary sources such as sunlight, electric light bulbs, etc. If desired radiation from other light sources may be used which give more selective radiations such, for example, as sources which emit ultra-violet rays or rays of like short wave length.

The reactions illustrated by the above examples are carried out in the absence of solvent; if desired, however, a mutual solvent which is inert with respect to the reactants may be used. As examples of such inert solvents may be mentioned benzene or other aromatic hydrocarbons, aliphatic hydrocarbons, chlorinated derivatives of these, and ethers.

Both the monomeric and dimeric compositions of matter described herein are suitable as plasticizers for synthetic resins and cellulose derivatives, especially cellulose acetate. Being thio derivatives, their applicability to uses as insecticides, pharmaceuticals, and more particularly as rubber accelerators is indicated.

Upon consideration of the above specification, it will be realized that many changes may be made in the details therein given without departing from the scope of invention or sacrificing any of its advantages.

I claim:

1. A process for the preparation of aryl thioethers of aliphatic carboxylic acid esters which comprises reacting a thiophenol with a compound selected from the group consisting of esters of acrylic and esters of an alpha-alkacrylic acid, by subjecting the reactants to light radiations.

2. The process of claim 1 in which the reactants are subjected during the reaction to light radiations.

3. A process which comprises reacting a thiophenol with a compound selected from the group consisting of lower alkyl esters of acrylic acid and lower alkyl esters of an alpha-alkacrylic acid, by subjecting the reactants to light radiations.

4. A process which comprises reacting a thiophenol with an alkyl alpha-alkacrylate, the reaction being effected in the presence of actinic light.

5. A process which comprises reacting a thiophenol with an alpha-alkyl substituted acrylic acid ester, by subjecting the reactants to light radiations.

6. A process of reacting thiophenol with methyl methacrylate, by subjecting the reactants to light radiations and thereby producing the phenyl thioether of methyl isobutyrate and a dimer of methyl methacrylate containing 1 molecule of thiophenol.

7. A process of reacting m-thiocresol with methyl methacrylate, by subjecting the reactants to light radiations and thereby producing the m-cresol thioether of methyl isobutyrate and a dimer of methyl methacrylate containing 1 molecule of m-thiocresol.

8. A process of reacting p-thiocresol with methyl methacrylate, by subjecting the reactants to light radiations and producing p-cresol thioether of methyl isobutyrate and the dimer of methyl methacrylate containing 1 molecule of p-thiocresol.

9. The process which comprises mixing substantially equal parts by weight of thiophenol with methyl methacrylate, exposing the resulting mixture to the rays of an electric light bulb for approximately 1 week, distilling the resulting product and obtaining as the lower boiling constituent thereof the phenyl thioether of methyl isobutyrate and as the higher boiling constituent thereof the dimer of methyl methacrylate containing 1 molecule of thiophenol.

10. The dimer of an alpha alkyl substituted acrylic acid ester containing an aryl thioether group obtainable substantially in accord with the process of claim 1.

11. The dimer of the methyl ester of methacrylic acid containing an aryl thioether group obtainable substantially in accord with the process of claim 5.

12. The dimer of methyl methacrylate containing approximately 1 molecule of thiophenol obtainable substantially in accord with claim 9 and having a boiling range of 189° C.–190° C. at 2.5 mm. pressure and a refractive index of $N_D^{20} 1.5279$

RALPH A. JACOBSON.